United States Patent [19]
Mutoh et al.

[11] Patent Number: 5,357,181
[45] Date of Patent: Oct. 18, 1994

[54] FAILURE DETECTION METHOD FOR ELECTRIC VEHICLES AND FAIL-SAFE CONTROL METHOD USING THIS METHOD

[75] Inventors: Nobuyoshi Mutoh, Katsuta; Ryoso Masaki; Tsutomu Omae, both of Hitachi; Sanshiro Obara, Tokai; Shotaro Naito, Katsuta, all of Japan

[73] Assignee: Hitachi, Ltd., Tokyo, Japan

[21] Appl. No.: 133,376

[22] Filed: Oct. 8, 1993

[30] Foreign Application Priority Data

Oct. 13, 1992 [JP] Japan ................................ 4-273983

[51] Int. Cl.⁵ ............................................... B60L 3/00
[52] U.S. Cl. ..................... 318/139; 318/811; 318/474; 318/490
[58] Field of Search ............... 318/727, 732, 734, 139, 318/474, 490, 810, 811

[56] References Cited

U.S. PATENT DOCUMENTS 3,961,688  6/1976  Maynard .
3,999,104  12/1976  Lardennois .
4,624,334  11/1986  Kelledes et al. .

FOREIGN PATENT DOCUMENTS 3-277101  12/1991  Japan .

Primary Examiner—Bentsu Ro
Attorney, Agent, or Firm—Evenson, McKeown, Edwards & Lenahan

[57] ABSTRACT

An object of the present invention is to secure safe driving of electric vehicles by enabling torque control regardless of sensor disorder. In the present invention, the mode of current sensor disorder is detected by a sensor disorder detection means. If it is found as a result that only 1 out of 3 current sensors is failing, the current of the failing current sensor is estimated by 2 normal current sensors and the torque control of the motor is continued by the ordinary torque control system. If 2 or more current sensors are found to be failing, a torque control system based on an AC current reference operation means is formed to control the motor torque based on the AC current reference. If a sensor failure detection means determines that only 1 phase is failing in the speed sensor, the motor torque is controlled by using the remaining 1 phase to detect the rotating angular speed of the motor. If all speed sensors are failing but the current sensors are normal, the motor torque is controlled by estimating the motor torque from the 3 phase AC current. If both the current sensors and the speed sensors are found to be failing, the motor torque is controlled based on the estimated torque control and rotating angular speed to continue the driving that is needed to avoid dangerous situations.

24 Claims, 12 Drawing Sheets

FAILURE DETECTION METHOD FOR ELECTRIC VEHICLES AND FAIL-SAFE CONTROL METHOD USING THIS METHOD

FIELD OF THE INVENTION

The present invention concerns a failure detection method for electric vehicles and a fail-safe control method using this method, particularly a failure detection method for electric vehicles which is suitable for electric vehicles driven by an alternating current motor and a fail-safe control method using this method.

BACKGROUND OF THE INVENTION

In general, an electric vehicle is comprised of a battery for supplying electric power, a PWM inverter for converting DC power of that battery into AC power of variable voltage and variable frequency, a 3 phase AC motor, a speed sensor installed on that 3 phase AC motor, a drive system comprised of several current sensors for detecting current that flows through the winding of that 3 phase AC motor, a torque reference operation means that determines torque reference of the 3 phase AC motor based on accelerator opening, an AC current reference operation means that determines the size and phase of current flowing through the winding of the 3 phase AC motor based on that torque reference and the rotating angular speed, a current control means that determines AC voltage reference so that the 3 phase AC current will follow that AC voltage reference, and a PWM signal generation means that determines the gate signal applied to the PWM inverter based on that AC voltage reference.

Generally, the configuration of a torque control system for the electric vehicle is based on the torque reference which is dispatched from the driver via the accelerator opening, electric current which is detected from the electric current sensor and the rotating angular speed which is detected by the speed sensor. For this reason, as disclosed in Japanese Patent Application Laid Open No. 3-277101, safety during motion was secured by introducing a double sensor system so that one can switch to the other sensor in the event one sensor fails, thereby driving the motor based on information obtained from this auxiliary sensor.

As shown above, while reliability of sensing itself is improved by introducing a multiple sensor system, reliability of the control system as a whole is not necessarily improved owing to increase in cables and connector terminals for taking in the detected information.

Further, there are cases where other sensors in a multiple sensor system that are supposed to serve as the back-up also fail depending on the cause of failure. In these cases, there was a problem of possible danger that occurred when switching to an auxiliary means.

SUMMARY OF THE INVENTION

An object of the present invention is to provide a failure detection method and a failure detection device for electric vehicles that can be used easily and with high reliability.

Another object of the present invention is to provide a fail-safe control method and control device for electric vehicles that make it possible to keep driving the vehicle depending on the mode of sensor failure.

A characteristic of the present invention lies in determining the disorder in the current sensor by using at least 2 phase currents that are detected directly by that current sensor in the electric vehicle which performs variable speed drive of 3 phase AC motor.

Another characteristic of the present invention lies in switching the AC current reference operation means and current control means to an AC voltage reference operation means which obtains the AC voltage reference from torque reference obtained from the torque reference operation means and rotating angular speed of the 3 phase AC motor obtained from the speed sensor after disorder of one of the current sensors is identified. In determining the gate signal which is applied to the PWM inverter based on an AC current reference obtained from that AC voltage reference operation means in the electric vehicle.

"Detecting the mode of sensor failure" herein refers to detecting the status of current sensors such as whether it is only the U phase current sensor, for instance, which is failing among current sensors that sense 3 phase AC current, 2 phases of current sensors such as U phase and V phase sensors are failing, or all sensors are failing. Further, in the case of a speed sensor, it refers to detection of whether one of the A phase and B phase rotary encoders is failing, or both phases are failing.

In the present invention, failure mode of current sensor and speed sensor is detected through sensor failure detection means. If no disorder is detected as a result, normal torque control system is formed through rotating angular speed detection means, torque reference operation means, AC current reference operation means, current control means and PWM signal generation means based on 3 phase AC current and 2 phase pulses of phases A and B that were obtained from current sensor and speed sensor, generating 3 phase AC current reference based on torque reference to control the torque to the motor.

If only 1 of the 3 current sensors is failing, the current at the failing current sensor is estimated by the 2 normal current sensors and torque control of the motor is continued as it is through normal torque control. If failure of 2 or more current sensors is detected, torque control based on AC current reference operation means and current control means is stopped and a torque control system based on AC voltage reference operation means is formed to control motor torque based on AC voltage reference.

Incidentally, motor torque is estimated if system configuration allows taking in battery current, and the size and angular frequency of AC voltage reference is determined so that this estimated torque will coincide with torque reference. At the same time, the rotating angular speed obtained by rotating angular speed detection means is also used if the speed sensor is normal to determine the said 2 values of size and angular frequency.

If a failure occurs at a speed sensor, the rotating angular speed obtained from rotating angular speed set-up means is used to determine the said 2 values.

If only 1 phase of the speed sensor is found by sensor failure detection means to be failing, the other remaining phase is used to detect the rotating angular speed of a motor by rotating angular speed detection means. A normal torque control system in the foregoing is formed by torque reference operation means, AC current reference operation means, current control means and PWM signal generation means based on this rotating angular speed to control the motor torque.

In the event all speed sensors fail and the current sensor is normal, motor torque is estimated from 3 phase AC current, slip angular frequency of the motor is determined from this estimated torque and torque reference, and the amplitude and angular frequency of AC voltage reference are determined based on the rotating angular speed estimated from this slip angular frequency and set-up value of rotating angular speed. As a result, PWM signal is generated based on the AC voltage reference and driving of the electric vehicle is continued.

If the sensor failure detection means finds that both current sensor and speed sensor failed, the amplitude and angular frequency of AC voltage reference are determined from the torque reference and set value of rotating angular speed obtained from torque reference operation means and rotating angular speed setting means, respectively; and PWM signal is generated based on AC voltage reference which is obtained as a result to control the motor torque and continue the driving that is needed to avoid a dangerous situation.

As the present invention enables continued driving even when a disorder occurs in the speed sensor or current sensor which play an important role in execution of torque control, it further improves the safety of electric vehicles. Addition of such degraded back-up control to an electric vehicle will enable dissemination of electric vehicles in the mass market. Further, it will facilitate maintenance by identifying the sensor failure mode.

DETAILED DESCRIPTION

Figure 1:
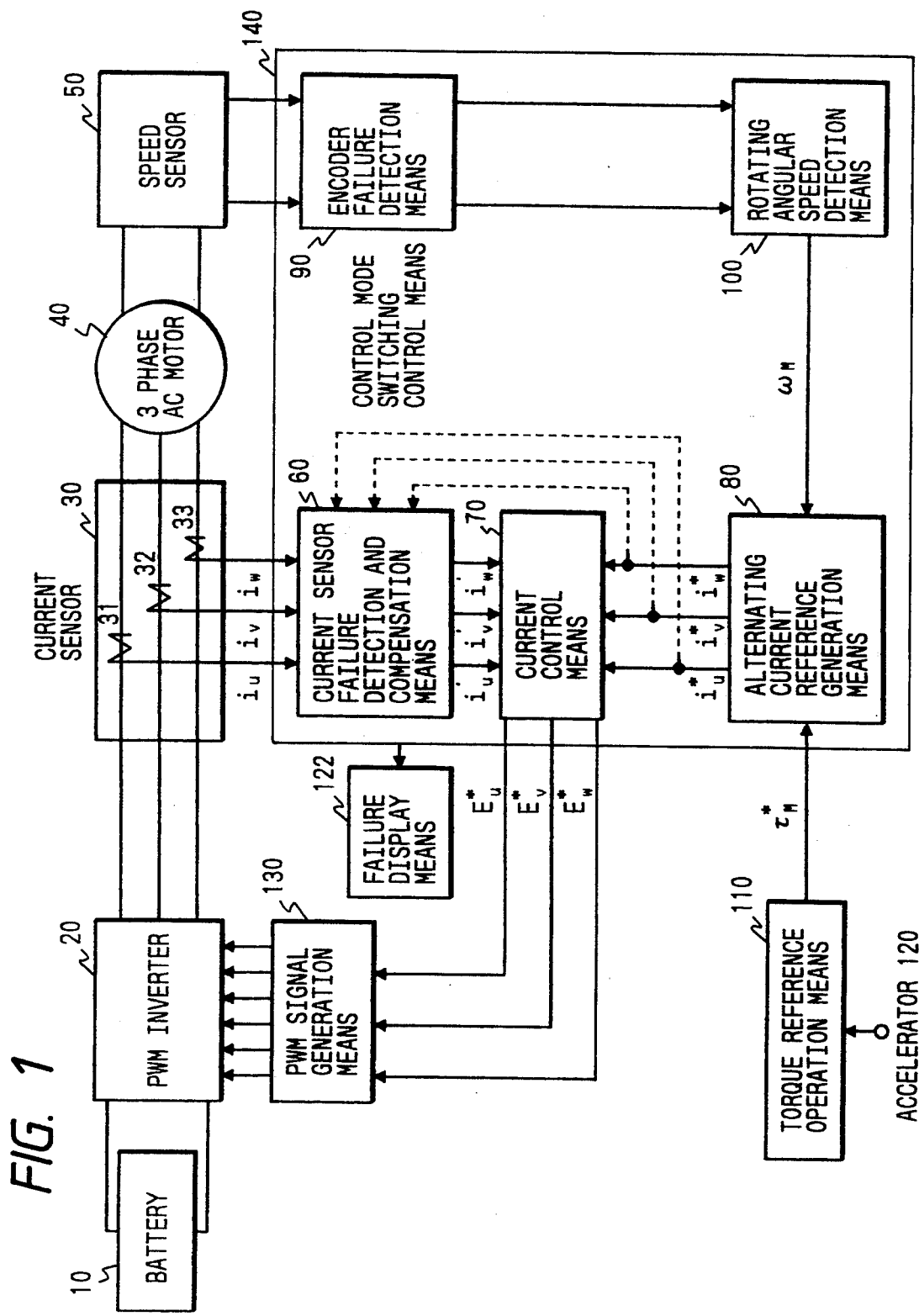
FIG. 1 is a basic configuration diagram for performing torque control of the present invention.

An explanation will be made in the following based on an embodiment of the present invention. FIG. 1 is a structure equipped with speed sensor and a current sensor detection means to perform degraded backup control based on AC current reference. The DC voltage of a battery 10 is converted to a 3 phase AC voltage with variable frequency and variable voltage by a PWM inverter 20 to control the torque of a 3 phase AC motor 40. Here, 30 corresponds to 3 current sensors that detect primary current ($i_u$, $i_v$ and $i_w$) of the 3 phase AC that flows through the primary winding of a 3 phase AC motor 40 and 50 is a speed sensor which is attached to the shaft of AC motor 40. 140 is a control mode switching control means and contains a current sensor failure detection and compensation means 60, a current control means 70, an AC current reference generation means 80, an encoder failure detection means 90 and a rotating angular speed detection means 100. A current sensor failure detection and compensation means 60 detects the failure of 3 current sensors and compensates for the failed sensor. A current control means 70 controls the primary current which is detected through a current sensor failure detection and compensation means 60 at a predetermined value. An AC current reference generation means 80 generates reference ($i_u^*$, $i_v^*$ and $i_w^*$) for a current control means 70. An encoder failure detection means 90 detects the failure mode of the speed sensor (rotary encoder) from phase A and phase B that are output from a speed sensor 50 and have 90 degree phase difference between the two. A rotating angular speed detection means 100 detects rotating angular speed $\omega_M$ of an AC motor from phase A and phase B pulses. 110 refers to a torque reference operation means that generates torque reference $\tau_M^*$ based on an accelerator 120 while 122 refers to a failure display means. 130 refers to a PWM signal generation means that forms a PWM signal based on output signal ($E_u^*$, $E_v^*$, $E_w^*$) of a current control means 70.

Figure 2:
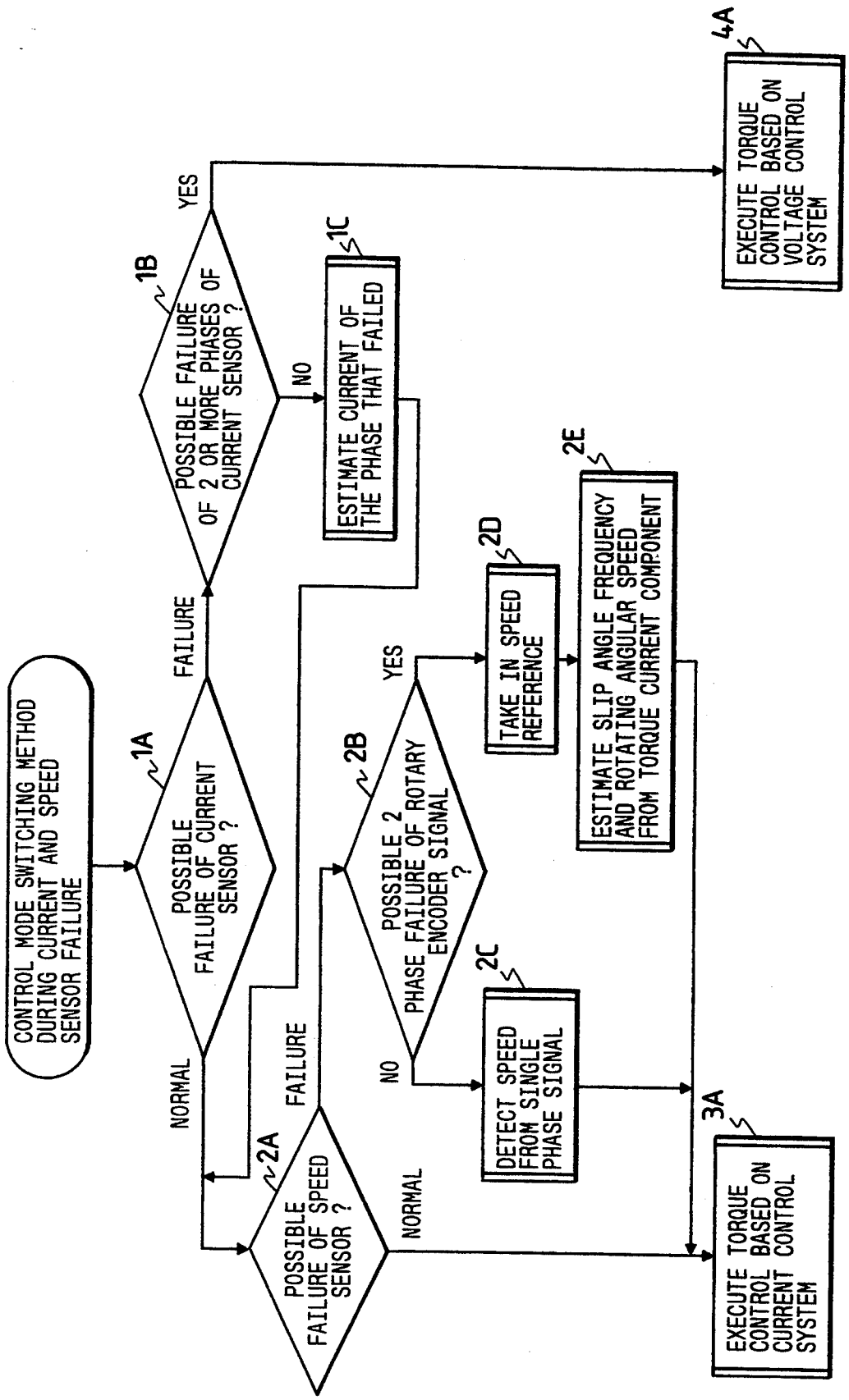
FIG. 2 is a flowchart explaining the principle of the present invention.

FIG. 2 shows how torque control is executed by a control mode switch control means 140 according to sensor failure mode. When both current sensor and speed sensor are normal (1A, 2A), a torque control system (3A) based on current control system is being executed. It is an ideal control system for performing torque control. In other words, rotating angular speed, slip angular frequency (torque current) and secondary flux (magnetizing current) of a motor are all controlled in such a way that vector control requirements of an induction motor will be satisfied based on torque reference to perform an efficient torque control.

When a current sensor failure occurs, determination of whether 2 phases or more of sensors are failing (1A, 1B), and, if only 1 phase is failing, the current that was supposed to be obtained from the failed sensor is estimated by using the current obtained from the remaining 2 sensors (1C) and executes torque control based on current control system regardless of speed sensor failure (2A through 2E, 3A).

If 2 or more phases of current sensor are failing (1A, 1B), an AC voltage reference is generated based on torque reference, torque control system is formed and driving is continued (4A). In this case, the method through which an AC voltage reference is formed differs depending on the mode of speed sensor failure and whether battery current can be used. This will be explained later in more detail.

As explained above, driving can be continued by changing the configuration of the control system, which is formed by torque reference according to the mode of sensor failure, from torque control based on AC current reference to torque control based on AC voltage reference, although the performance of torque control will deteriorate. In other words, a degraded backup control according to the mode of sensor failure will become possible.

Figure 3:
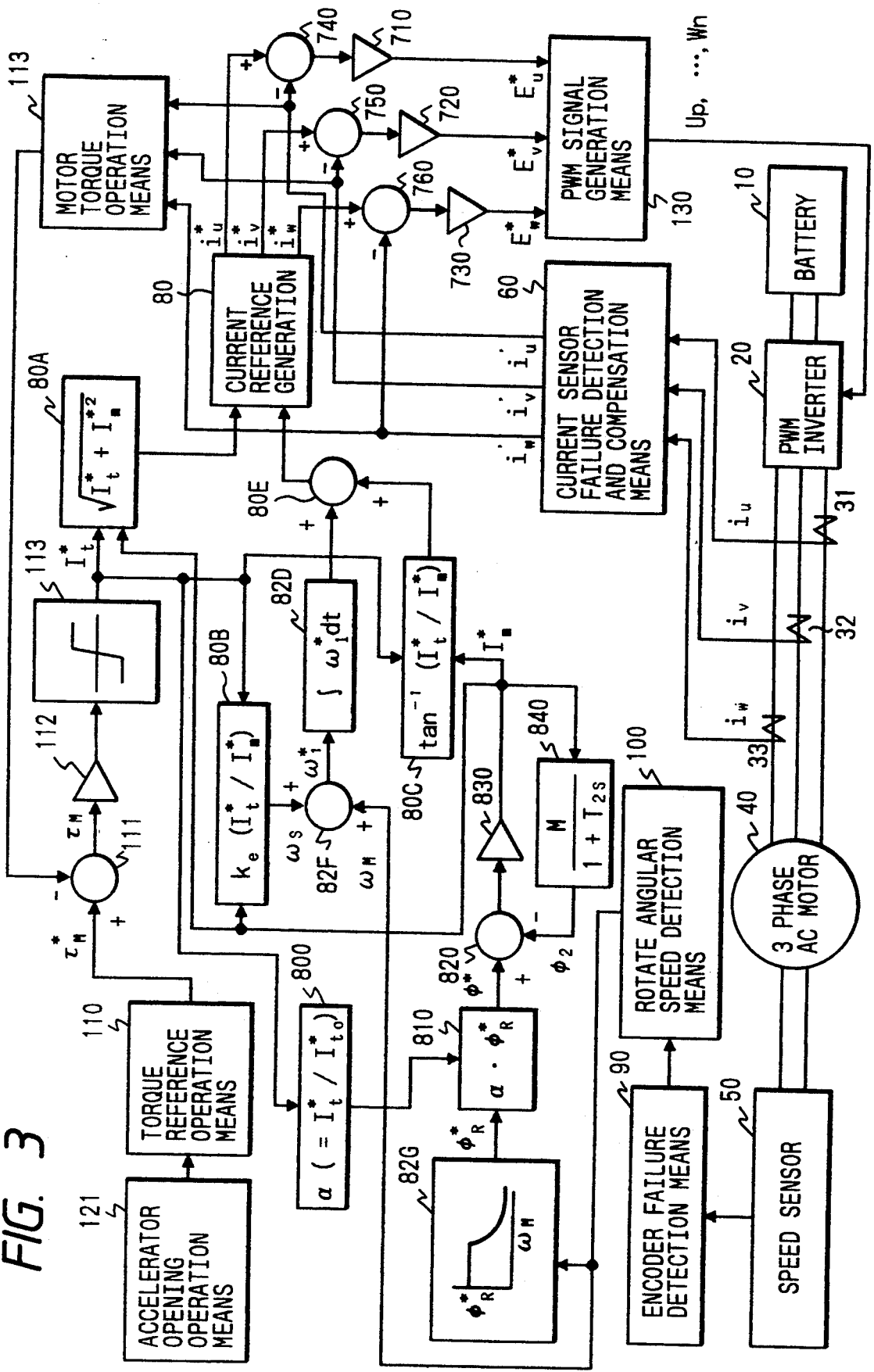
FIG. 3 is a block diagram for performing torque control based on a current control system.

FIG. 3 shows a detailed configuration of torque control which is obtained by introducing an actual configuration of respective means in FIG. 1, particularly an AC current reference generation means 80 of a control mode switching control means 140. An operation of amount corresponding to the amount of pressure on the accelerator is performed by an accelerator opening operation means 121, and the torque reference $\tau_{M^*}$ to be given to a 3 phase AC motor 40 is obtained by a torque operation means 110 based on this result. The deviation of this torque reference $\tau_{M^*}$ from a motor torque $\tau_M$ is obtained by adder/subtracter 11, and this is converted into a torque current reference $I_{t^*}$ through a motor torque regulator 112, which is comprised of PI (proportional +integration) compensator, and a limiter 113.

Here, a motor torque $\tau_M$ is found through (Formula 1) by using torque current $I_t$ and magnetizing current $I_m$ that were obtained through d-q axis conversion of 3 phase AC current $i_u'$, $i_v'$ and $i_w'$, which, in turn, were obtained by putting $i_u$, $i_v$ and $i_w$, which were detected by current sensors 31, 32 and 33, through a current sensor detection and compensation means 60. Magnetizing current reference $I_{m^*}$, is determined as follows:

$$\tau M = (3/2) \cdot P \cdot (M^2/M + l_2) \cdot I_m \cdot I_t \qquad 1$$

Whereas,
P: Pole
M: Magnetizing inductance
$l_2$: Secondary leakage inductance

A flux pattern generator 82G is used to generate flux $\Phi_{R^*}$, which should be generated on secondary circuit of the motor in response to the rotating angular speed $\omega_M$ which is obtained via a speed sensor 50, an encoder failure detection means 90 and a rotating angular speed detection means 100. A flux pattern generator 82G generates flux patterns that are constant when rotating angular speed of an AC motor 40 is lower than the base speed and are in inverse proportion to the rotating angular speed when it is higher than the base speed. Secondary flux reference $\Phi^*$, is found by multiplying flux $\Phi_{R^*}$ by the load rate which is determined by (Formula 2).

$$\alpha = I_{t^*}/I_{t0} \qquad 2$$

Whereas,
$I_{t0}$: Rated torque current

Next, deviation from $\Phi^*$, which is an estimation of secondary flux generated on the secondary circuit of that secondary flux reference $\Phi_2$ and an AC motor 40 according to an adder/subtracter 820 through (Formula 3), is obtained and magnetizing current reference $I_{m^*}$ is generated from the output of a PI compensator 830.

$$\Phi_2 = (M \cdot I_{m^*})/(1+T_2 \cdot s) \qquad 3$$

Whereas,
$T_2 (=(M+l_2)/r_2)$: Secondary time constant
$r_2$: Secondary resistor By using a torque current reference $I_{t^*}$ and a magnetizing current reference $I_{m^*}$ obtained in the foregoing manner, slip angular frequency $\omega_s$ and phase $\theta_1$ can be found from an operator 80B and an operator 80C, respectively, which execute (Formula 4) and (Formula 5).

$$\omega_s = K_s \cdot (I_{t^*}/I_{m^*}) \qquad 4$$

Whereas, $k_s = r_2 /(M+l_2)$ $$\theta_1 = \tan^{-}(I_{t^*}/I_{m^*}) \qquad 5$$

The angular frequency of an AC current reference (primary angular frequency) $\omega_{1^*}$ can be found by executing an addition between slip angular frequency $\omega_s$ and rotating angular speed $\omega_M$ with an adder 82. Instantaneous phase of an AC current reference can be found by executing an integration of primary angular frequency $\omega_{1^*}$ with an integrator 80A.

The phase of an AC current reference can be found by adding the said instantaneous phase and phase $\theta_1$ with an adder 80D and the amplitude of that AC current reference can be found through an operation by an operator 80A. At a current reference generator 80, 3 phase current references $i_{u^*}$, $i_{v^*}$ and $i_{w^*}$ are generated based on these values. Standard signals $E_{u^*}$, $E_{v^*}$ and $E_{w^*}$ for generating PWM signal are generated by a current control means 70 which is comprised of adders/subtracters 740, 750 and 760 as well as PI compensators 710, 720 and 730 so that 3 phase AC current $i_u'$, $i_v'$ and $i_w'$ will follow these AC current references.

At PWM signal generation means 130, that standard signal and triangular wave are compared to obtain the PWM signal and a gate signal with 6-piece power device comprising the arm of a PWM inverter 20 is formed based on the PWM signal that was obtained as a result.

Figure 4:
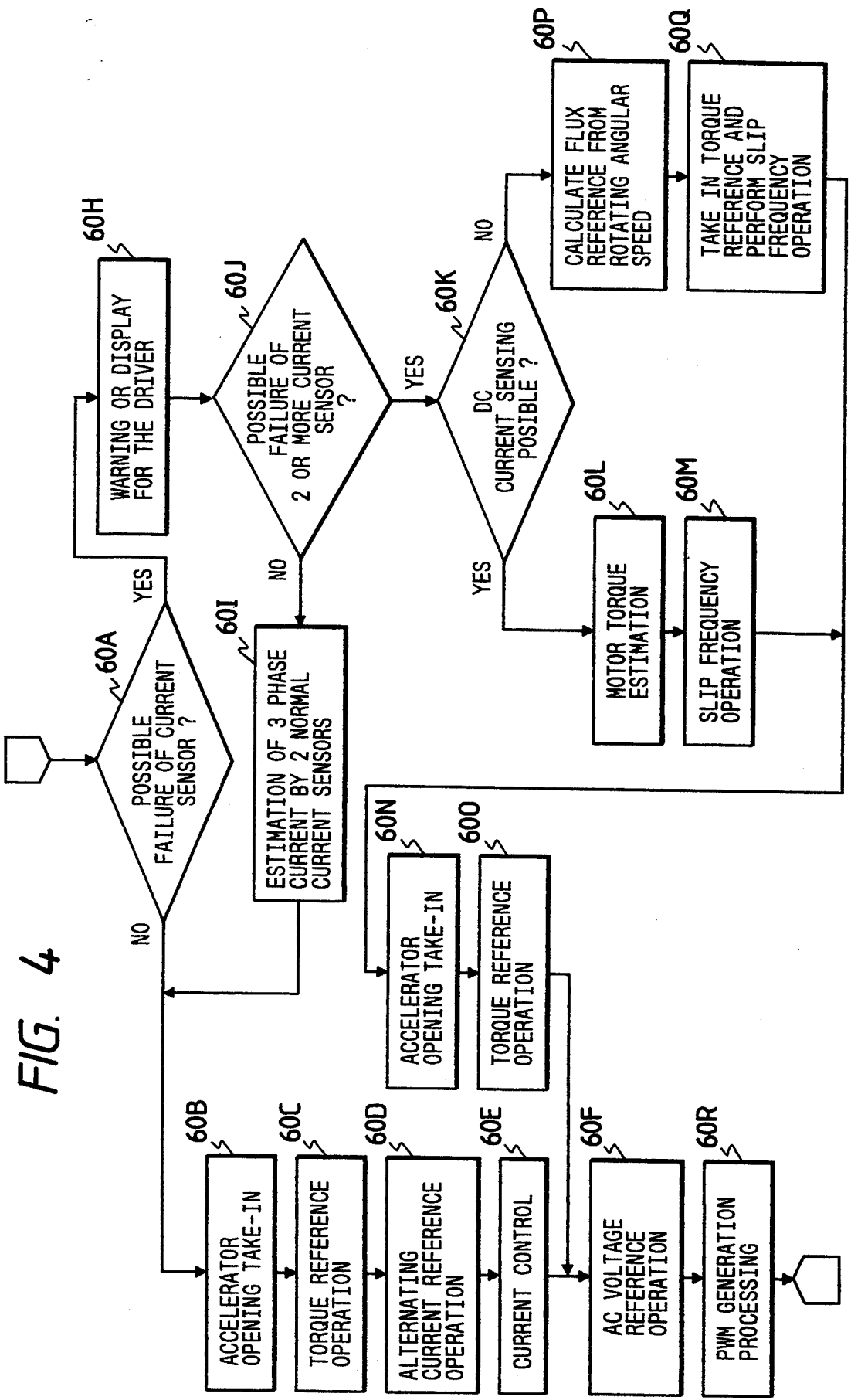
FIG. 4 is a flowchart explaining the method for performing torque control according to the mode of current sensor failure.

The foregoing is a case where a sensor generates an AC current reference under normal condition, and torque control is executed through processing at the left portion of FIG. 4. In other words, accelerator opening take-in (60B), torque reference operation (60C), AC current reference operation (60D), current control (60E), AC voltage reference operation (60F) and PWM generation processing (60R) are performed respectively when the sensor is normal (60A). A warning is given to the driver when a sensor failure is detected at step 60A (60H) and whether there are 2 or more failing sensors is checked (60J). If it is found as a result that only 1 sensor is failing, deterioration of torque control performance is restrained by detecting the current of the failed sensor by using the 2 other normal sensors (60I) and executing the processing at the left portion of the said FIG. 4 (60A, 60B, 60C, 60D, 60E, 60F and 60R). If it is found in step 60J that 2 or more sensors are failing, a control mode switching signal is generated to switch to torque control through an AC voltage reference.

Figure 5:
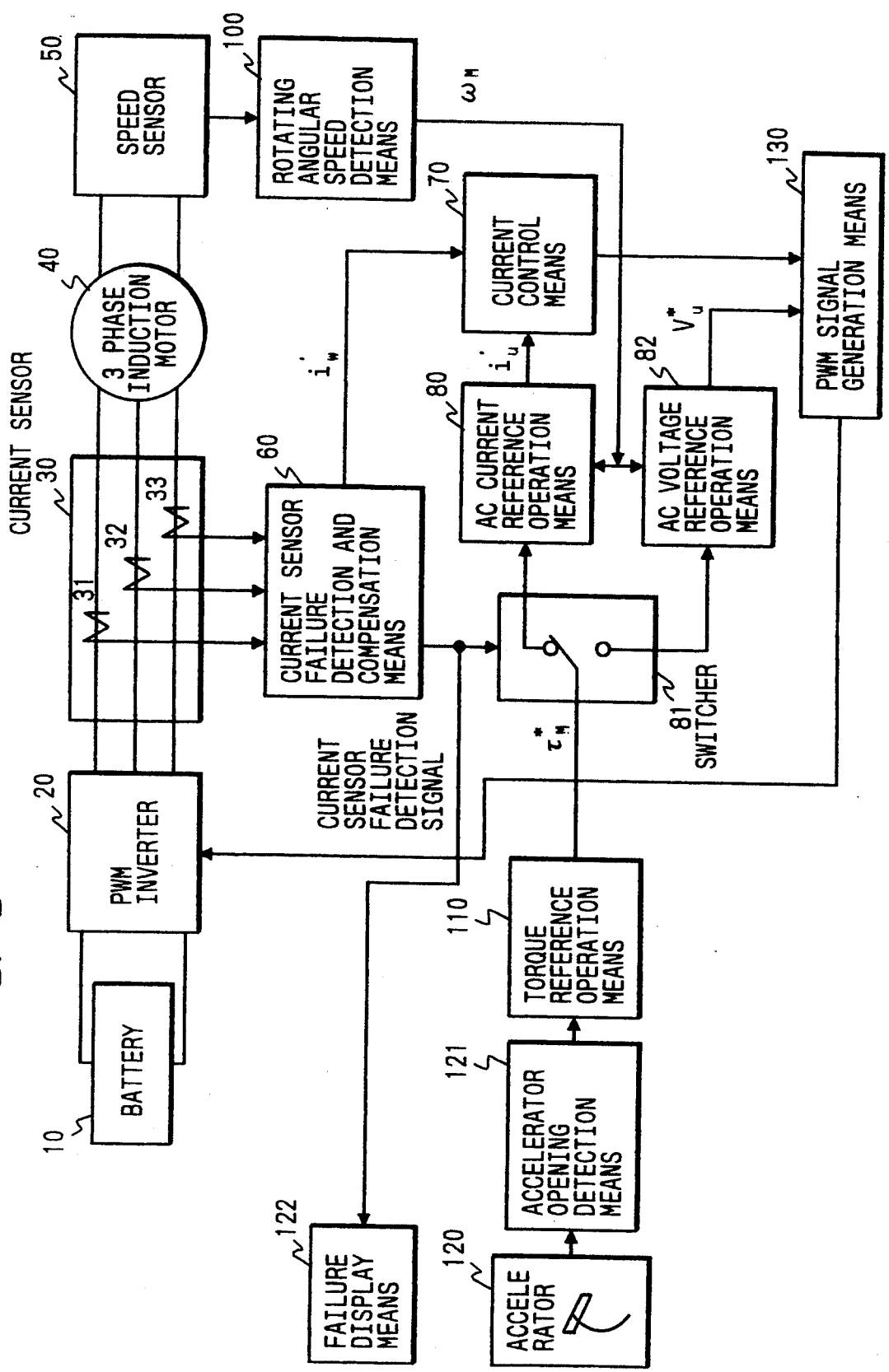
FIG. 5 is a basic configuration diagram for enabling degraded backup control during current sensor failure.

FIG. 5 shows a block diagram for performing degraded backup control when 2 or more of the current sensors 30 are failing. When it is known through a current sensor detection and compensation means 60 that 2 or more structures are failing, a current sensor failure detection signal will enter the switcher 81. Then a torque reference $\tau_M^*$, which was obtained by a torque reference operation means 110 based on the information from an accelerator 120 and an accelerator opening detection means 121, is input into an AC voltage reference operation means 82 instead of an AC current reference operation means 80.

The AC voltage reference operation means 82 forms a 3 phase AC voltage reference (only the voltage reference $V_u^*$ of U phase is shown in FIG. 5) through a torque reference $\tau_M^*$ and a rotating angular speed detection means 100. That AC voltage reference is introduced to a PWM signal generation means 130 and compared with a carrier wave (generally a triangular wave, not shown in the diagram) to form a PWM signal.

PWM inverter 20 is controlled based on that PWM signal. PWM inverter 20 generates an AC voltage corresponding to an AC voltage reference, and driving is continued by supplying it to the 3 phase induction conductor. Incidentally, a torque reference $\tau_M^*$ is introduced to an AC current reference generation means 80 when 1 or less current sensors are failing to generate 3 phase AC current reference (only the voltage reference $i_u^*$ of U phase is shown in the diagram) An AC voltage reference is generated from a current control means 70 so that the 3 phase AC current ($i_u'$ ...) will correspond with that current reference. At a PWM signal generation means 130, PWM signal, as in the case where 2 or more are failing, is formed by comparison of the carrier wave with that AC voltage reference to generate AC voltage from a PWM inverter 20 and drive a 3 phase AC motor 40.

If 2 or more current sensors are failing (60J), it is checked whether DC current (battery current) can be used to prevent further deterioration of performance during degraded backup control (60K). If possible, motor torque is estimated (60L), operation of slip frequency is performed (60M), accelerator opening is taken in (60N) and operation of torque reference is performed (60O). Further, torque reference is performed by executing the respective processing of the said 60F and 60R. If sensing of DC current is not possible, torque reference is performed by calculating flux torque reference from rotating angular speed (60P), taking in torque reference, performing operation of slip angular frequency (60Q) and executing respective processing of the said steps 60N, 60O, 60F and 60R. The difference between the two lies in how close of a value to the actual slip angular frequency can be used to perform the control. As will be explained in detail later, a slip angular frequency close to reality can be obtained in the former because the value equivalent to motor torque can be estimated.

Figure 6:
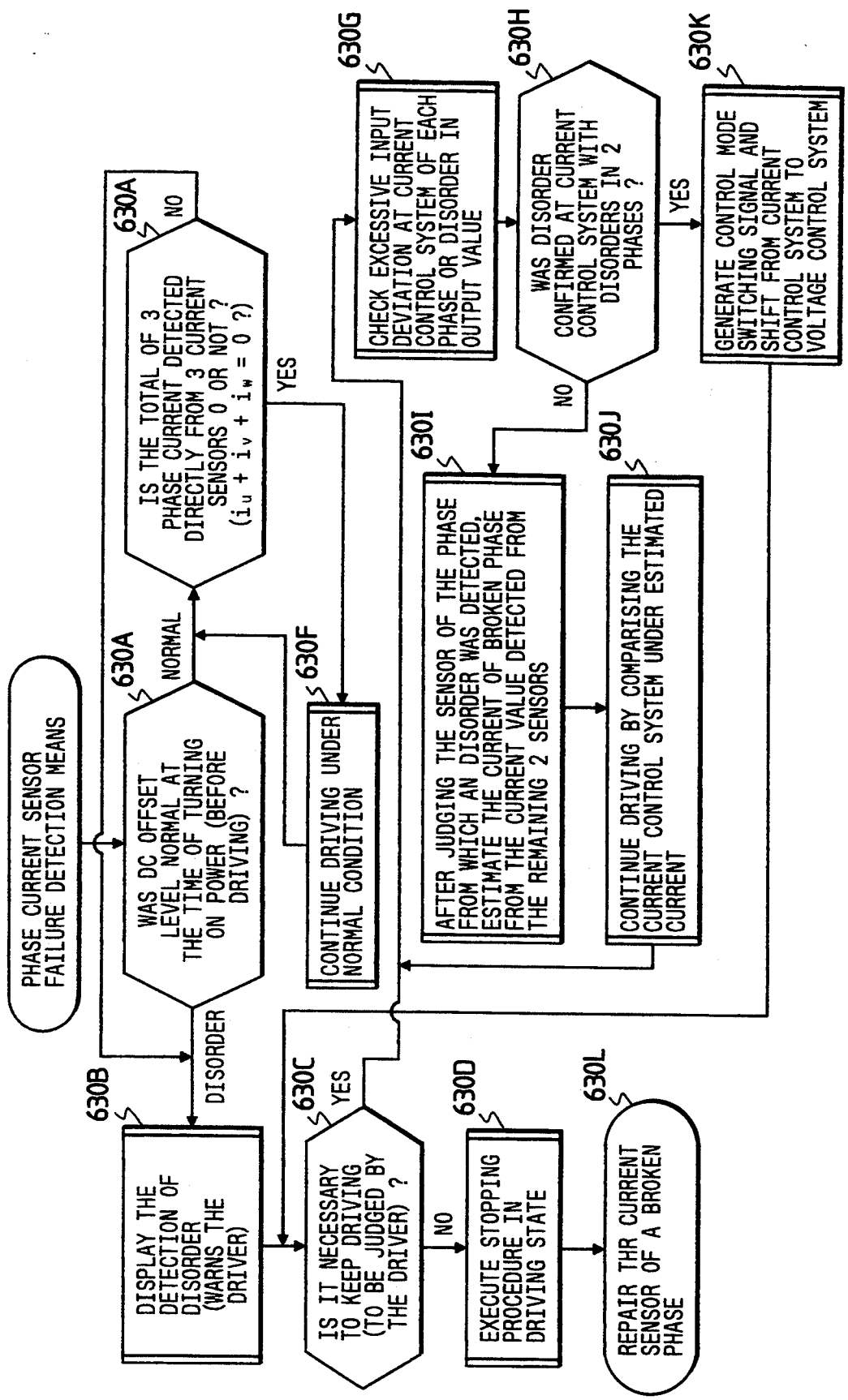
FIG. 6 is a diagram explaining the method for detecting phase current sensor failure.

The principle of phase current sensor failure detection means is explained in the following by using FIG. 6. First, when the vehicle is stand still, the DC off set level of current sensors is checked through initial current input processing (630A). If it is normal, it checks whether the sum of 3 phase current is 0 or not (630B) and the sensor is judged as normal if it is 0 (630F). In a practical system, the sum of the 3 phase currents is usually different than zero even during normal operation. The main reasons are that the current sensors have some offset values and the phase currents are not balanced due to the asymmetrical structure of the AC machine. Therefore, an estimated value of the maximum current error is predetermined for the actual system. The sum of the 3 phase currents are then compared to this error value to monitor the operating condition of the current sensor. If it is below this value the sensors are in normal condition. If this value exceeds a predetermined value, disorder in output from excessive input deviation of current control system is checked at the current control system of each phase and the current sensor of the phase at which a disorder is found is determined to be failing (630G). Based on this, whether disorder exists in only 1 phase or in 2 or more phases is determined (630H) and, when disorder is found only in 1 phase, driving is continued by estimating the current of the failing phase from the remaining 2 sensors and forming a current control system by switching to that estimated current (630I, 630J).

Figure 7:
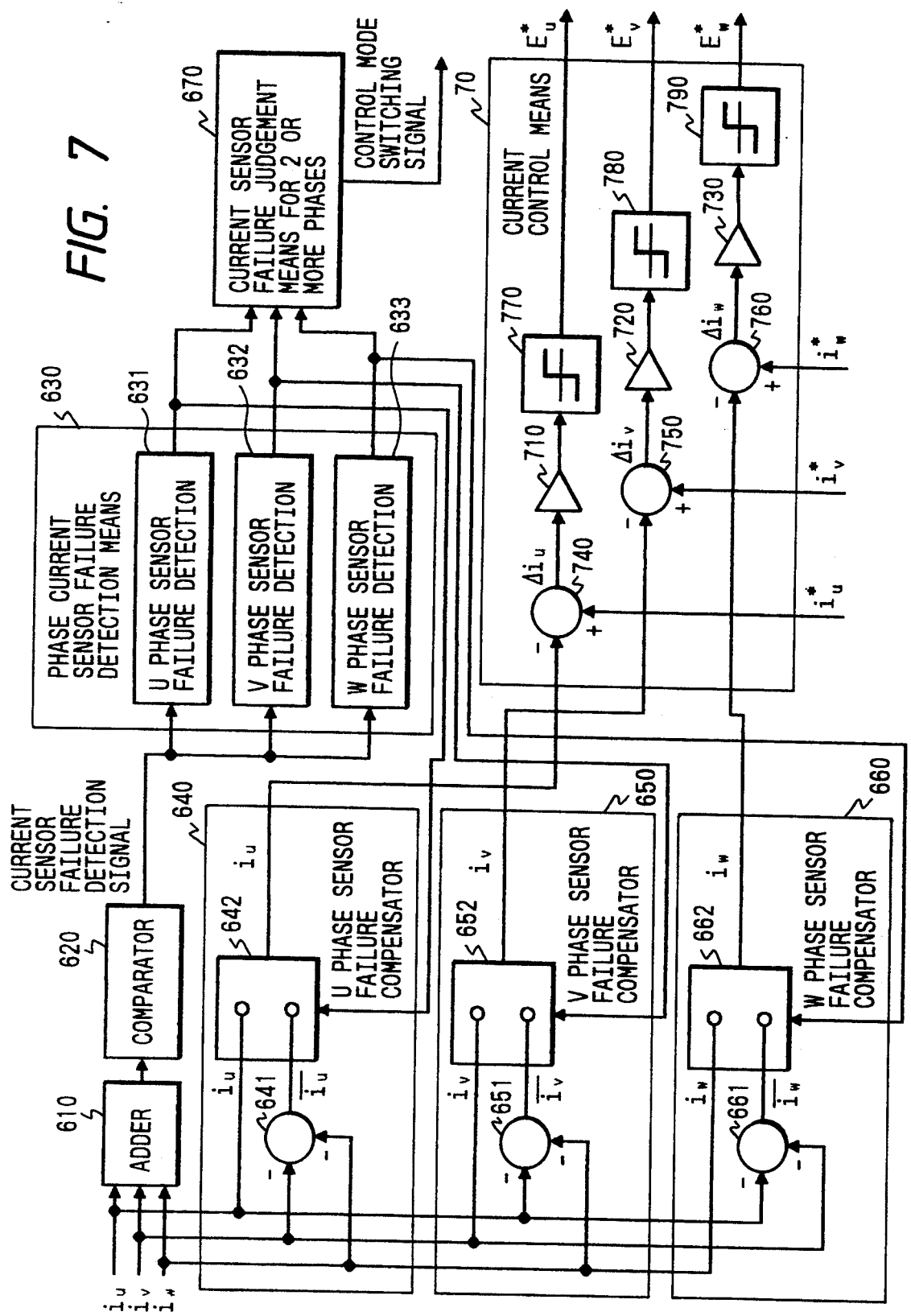
FIG. 7 is a control block diagram realizing the method in FIG. 6.

If 2 or more phases are failing, a control mode switching signal is generated to switch to a torque control system based on voltage reference (630K). Ac actual configuration of this is shown in FIG. 7. In other words, the sum of current at the 3 phases is checked by an adder/subtracter 610 and a comparer 620, generating a current sensor failure detection signal if there is any disorder and determining disorder in each phase sensor from disorder in input and output signal of corresponding current control means 70 through the use of a phasewise current sensor failure detection means 630. If failure exists only in 1 phase, the current of failing phase is input into the current control system of a current control means 70 to execute torque control through current control after compensating it by sensor failure compensators 640, 650 and 660 of each phase. The sensor failure compensators 640, 650 and 660 comprised of adders 641, 651 and 661 as well as switchers 642, 652 and 662. For example, if failure exists in U phase, compensating AC current $\bar{i}u$ is obtained by estimating the current flowing through the failing U phase current sensor from the remaining normal V, W phase current sensor.

If a phase current sensor failure detection means 630 determines that sensors are failing in 2 or more phases, a control mode switching signal is generated by a current sensor failure determination means 670 for 2 or more phases to switch to a torque control system using an AC voltage reference.

Figure 8:
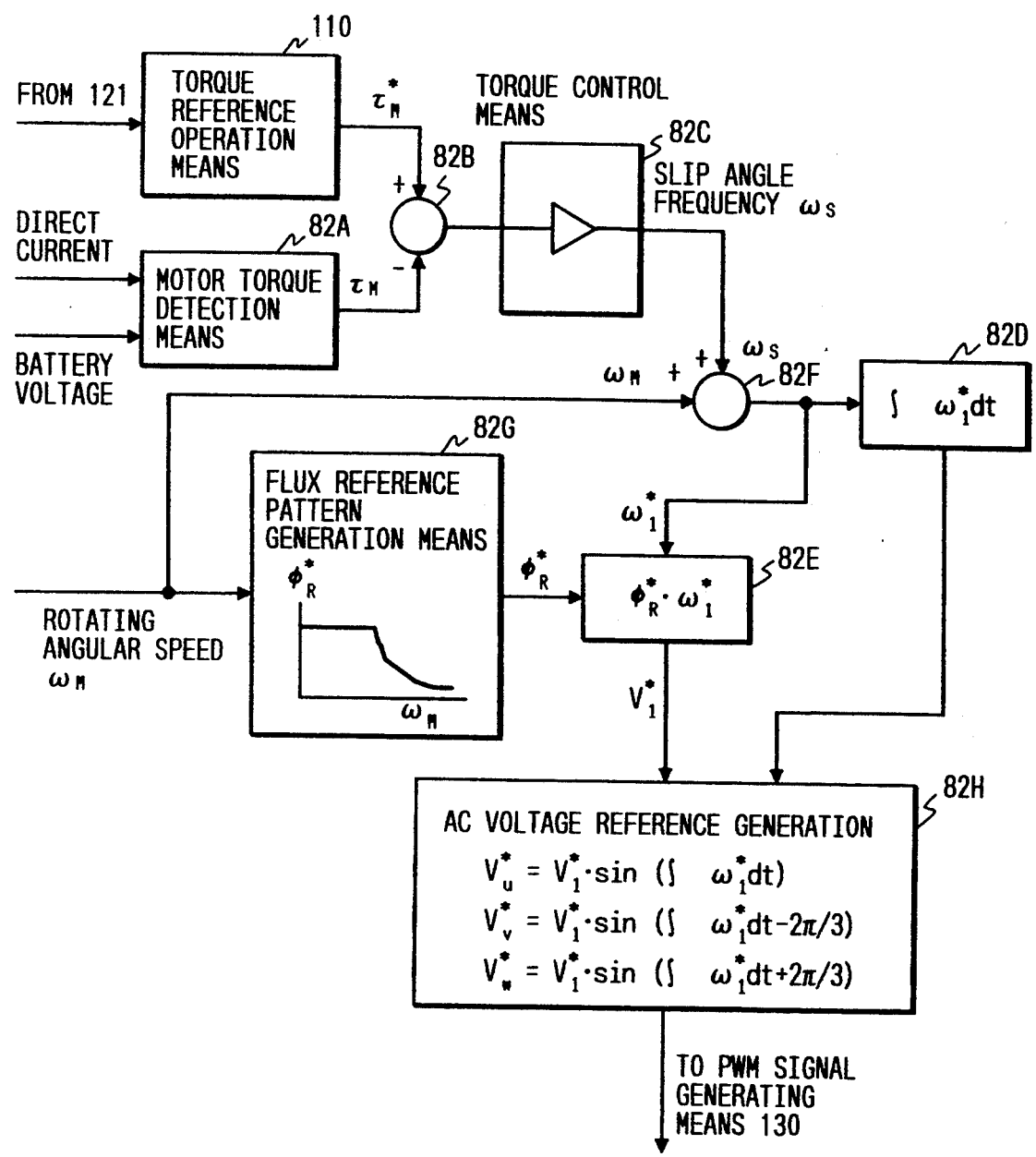
FIG. 8 is a block diagram that generates AC voltage reference during current sensor failure by using a battery.
Figure 9:
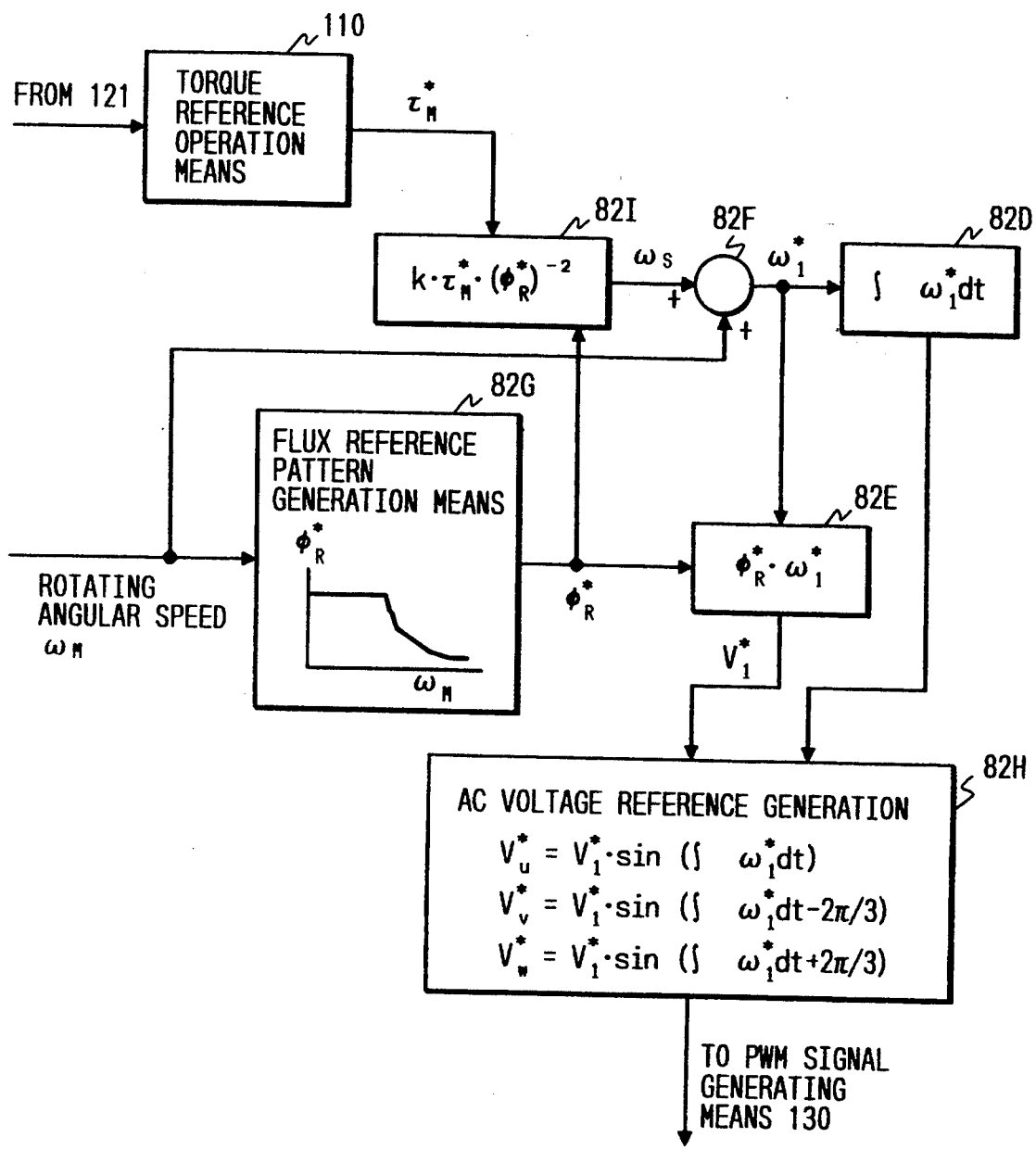
FIG. 9 is a block diagram that generates AC voltage reference during current sensor failure by not using a battery.

Next, a case in which torque control is performed according to AC voltage reference following a current sensor failure by using FIG. 8 and FIG. 9. A configuration up to generation of an AC voltage reference when DC current (battery current) flowing from battery 10 to PWM inverter 20 can be used is shown in FIG. 8. After obtaining a torque reference $\tau_M^*$ from a torque reference operation means 110, a deviation from a motor torque $\tau_M$ which is obtained from a motor torque detection means 82A based on that $\tau_M^*$ and (Formula 6) is obtained by an adder/subtracter 82B, and an operation of slip angular frequency $\omega_s$ is performed based on that deviation through a torque control means 82C which is comprised of PI compensators.

$$\tau M = E_D \cdot I_D / \omega_M \qquad 6$$

Whereas, $E_D$: Battery voltage $I_D$: Battery current (DC current)

Angular frequency $\omega 1$ of an AC voltage reference (primary angular frequency) is obtained by executing an addition of slip frequency $\omega_s^*$ and rotating angular speed $\omega_m$ by an adder 82D. Instantaneous phase of an AC voltage reference can be obtained by executing an integration of primary angular frequency $\omega_{1*}$ by an integrator 82D. The amplitude of an AC voltage reference $V_{1*}$ is obtained by obtaining the product of a flux $\Phi_R^*$, which was obtained by a flux reference pattern generation means 82H in response to rotating angular speed $\omega_m$, and a primary angular frequency $\omega_{1*}$ by using a multiplication means 82E. 3 phase AC voltage references $V_{u*}$, $V_{v*}$ and $V_{w*}$ are generated from that $V_{1*}$ and the said instantaneous phase by an AC voltage generation means 82H. Those AC voltage references are led to a PWM signal generation means 130 and generates a PWM signal, thereby controlling the torque.

FIG. 9 shows the configuration of torque control when battery current cannot be used. It is same as the torque control method in FIG. 8 except for the difference in the method for obtaining a slip angular frequency $\omega_S$. A slip angular frequency $\omega_s$ is obtained according to Formula 7 by using the flux $\Phi_{R*}$ which was obtained from a flux reference pattern generation means 82G and a torque reference $\tau_{M*}$ which was obtained from a torque reference operation means 110.

$$\omega_s = k \cdot \tau_{M*} / \Phi_{R*}^2 \qquad 7$$

Whereas, $k = 2r_2/3P$

Although the performance will be inferior to the torque control in FIG. 8 as information from the motor (load) side is not reflected in the slip angular frequency $\omega_s$ that was obtained in this manner, driving can be continued because it enables certain control based on torque reference.

Figure 10:
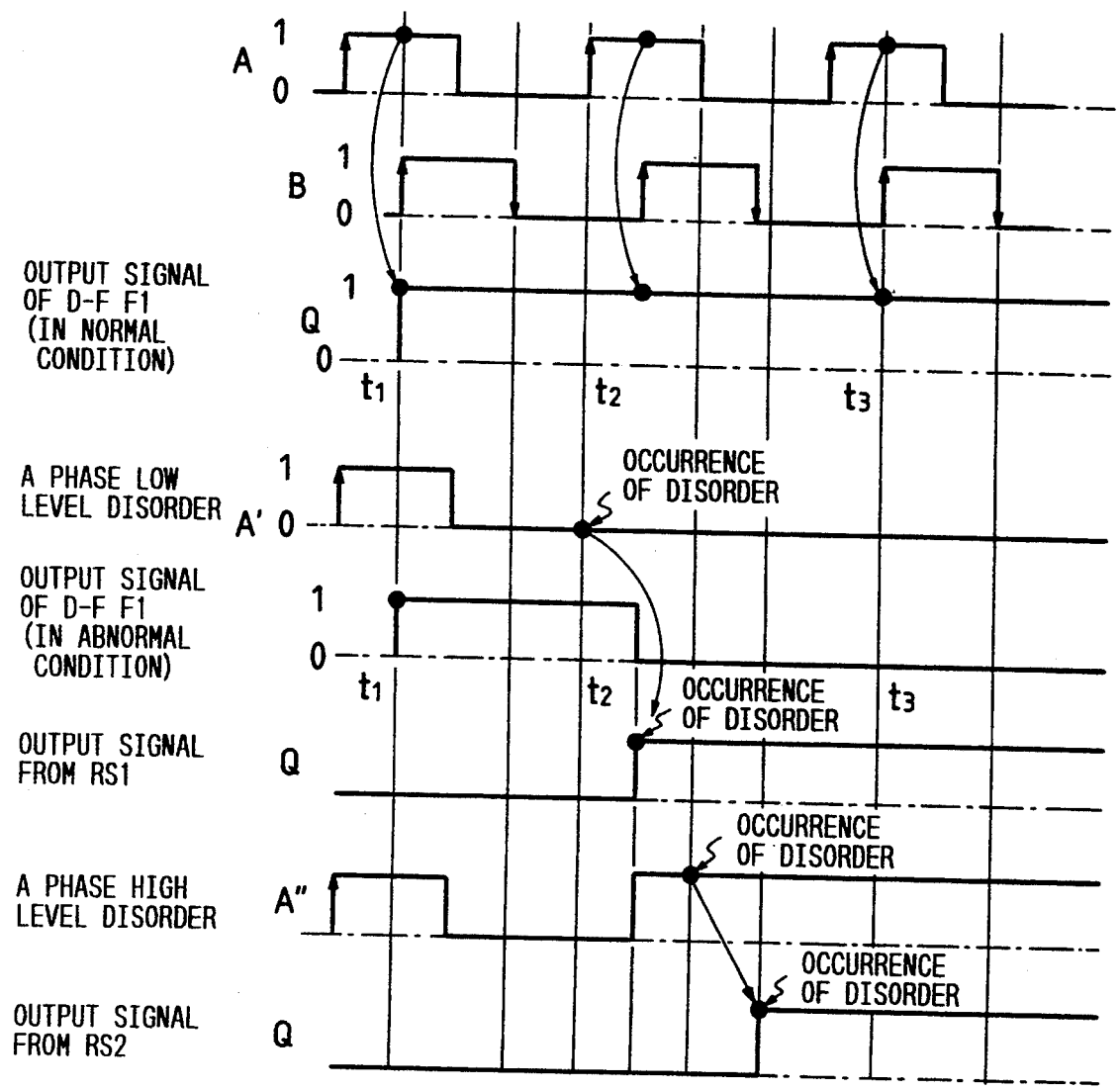
FIG. 10 is a time chart explaining the method for detecting the mode of 1 phase failure in a speed sensor.
Figure 11:
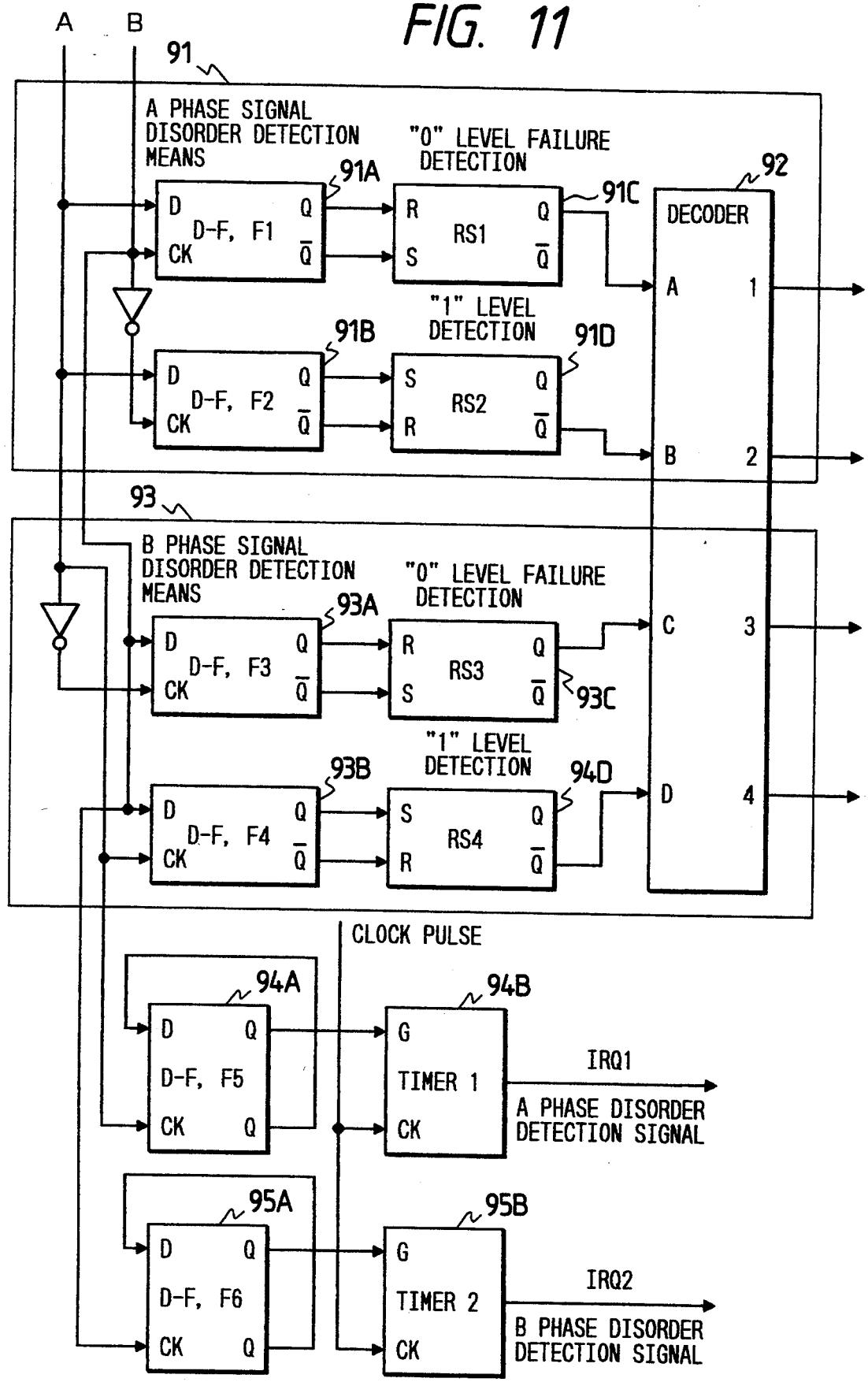
FIG. 11 is a circuit configuration diagram for detecting 1 phase failure and all phase failure of a speed sensor.

The next explanation will be on torque control when a speed sensor is failing. First, a failure detection method for a speed sensor is described. FIG. 10 shows a detection method when either phase A or phase B of an encoder is failing while FIG. 11 shows is configuration.

A phase A signal failure detection means 91 is comprised of 2 types of D-type flip flop, D-F. F1 (91A) and D-F. F2 (91B), 2 types of RS-type flip flop, RS1 (91C) and RS2 (91D), and a decoder 92. Flip flops 91A, 91B, 91C and a decoder 92 detect failure on level "0" while flip flops 91B, 91D and a decoder 92 detect failure on level "1."

The functions of the foregoing configuration are explained by using the time chart on FIG. 10. The D-type flip flop used here takes in the data that was input to a data terminal D that matches the rise time of the signal entering a clock terminal CK.

Therefore, if the signals in phase A and phase B are changing normally as shown in the figure, an output signal Q of a flip flop D-F. F1 remains at level "1." When phase A signal remains at level "0" as shown by signal A' at some point in time, i.e. when a level "0" failure occurs, an output signal Q of a flip flop D-F. F1 will reach level "0" at t2. As a result, a level "0" disorder of phase A signal is detected after an output signal Q of a flip flop RS1 reaches level "1," and this detection signal is obtained through an output terminal 1 of a decoder 92.

Incidentally, a level "1" disorder of phase A signal cannot be detected at this section as it will be same as D-F. F1 output signal under normal condition, and is detected instead by a section comprised of two flip flops 91B, 91D and the decoder 92. If phase A signal remains at level "1" at some point in time as in the case of signal A", an output signal Q of a RS flip flop RS2 will reach level "1" and a level "1" disorder is detected in phase A signal. This detection signal is obtained through an output terminal 2 of the decoder 92.

A phase B signal failure detection means 92 also has an identical configuration as a phase A signal failure detection means 91 and is comprised of 2 types of D-type flip flop, D-F. F1 (93A) and D-F. F2 (93B), 2 types of RS-type flip flop, RS1 (93C) and RS2 (93D), and the decoder 92, and uses the same detection for level "0" failure and level "1" failure Then the detection must also be possible when both phase A signal and phase B signal fail. Its configuration is comprised of a portion forming a phase A failure detection signal IRQ1 indicated by D-type flip flop D-F. F5 (94A) and a timer 1 (94B) in the lower column of FIG. 11 and a portion forming a phase B failure detection signal IRQ2 indicated by D-type flip flop D-F. F6 (95A) and a timer 2 (95B) in the lowermost column. D-F . F5 and D-F. F6 are frequency dividers that divide phase A and phase B signals in one half. The time elasped form the rise of the divided signal to the next rise is measured from clock pulse using a timer 1 and a timer 2. Failure detection signals IRQ1 and IRQ2 are generated when this interval exceeds a predetermined value by determining that signal is not generated from a speed sensor.

The next explanation is on the torque control when a speed sensor is determined to be failing. If either phase A or phase B is failing, a torque control based on current control system is performed when a current sensor is normal and a torque control based on voltage control system is performed when a current sensor is not normal, by assuming the angular speed which is twice that of the rotating angular speed obtained from a rotating angular speed detection means is the rotating angular speed $\omega_M$ of the actual motor.

If no signal is emitted form the speed sensor, a rotating angular speed that will serve as the standard is taken in from a rotating angular speed set-up means that has been prepared in advance and torque control is executed according to this standard.

Two ways of torque control are conceivable in this case. A vector control which estimates the rotating angular speed from slip angular frequency, torque current reference and set value of rotating angular speed with this torque control system as the basis. A publicly known technology which is generally known as vector control without speed sensor can be used for this vector control, the details of which are omitted here.

Figure 12:
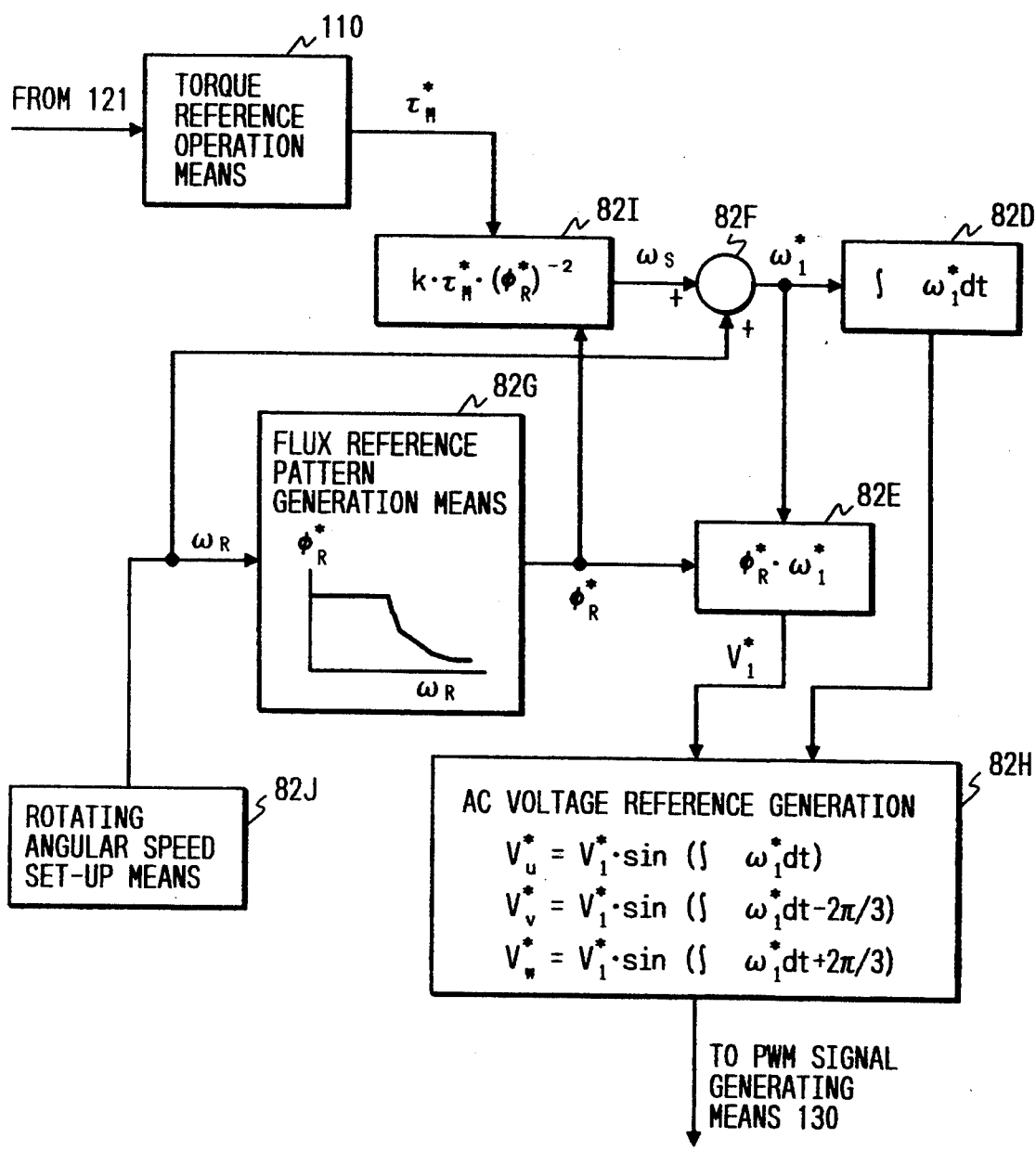
FIG. 12 is a configuration diagram of an AC voltage generating circuit for performing torque control when both speed sensor and current sensor failed.

The next explanation will use FIG. 12 to explain torque control in a case where both speed sensor and current sensor are failing. This torque control is an open loop control which is performed based on the torque reference $\tau_{M*}$ which is obtained from a torque reference operation means 110 and the set value of rotating angular sped $\omega_R$ which is obtained from a rotating angular speed set-up mean 82J. The operation method for obtaining voltage reference is same as that shown in FIG. 9 except for the use of this $\omega_R$.

What is claimed is:

1. An electric vehicle equipped with a battery for supplying electric power, a PWM inverter for converting DC current of that battery into AC power of variable voltage and variable frequency, a three phase AC motor for driving the vehicle, current sensors for detecting the current flowing through that three phase AC motor, a three phase AC current reference generation means that generates a three phase AC current reference for controlling the phase current that flows through the winding of that three phase AC motor, and a signal generation means that generates the signal which is applied to the gate of the PWM inverter based on the three phase AC current reference and the current of the three phase AC motor, wherein a failure detection method for the electric vehicle comprises the step of using at least two phase currents that are detected directly by the current sensors in determining disorder in that current sensors.

2. The failure detection method according to claim 1, further comprising the step of determining whether one of three current sensors is failing by mutually comparing the deviation of said three phase AC current reference from the three phase current which is detected from said current sensors when the requirement that the sum of respective phase currents detected directly shall be below predetermined value is not fulfilled.

3. The failure detection method according to claim 2 wherein the predetermined value is zero.

4. The failure detection method according to claim 1, further comprising the step of determining a current sensor failure by making the judgment of whether the phase current of each phase winding which is detected directly from one of said current sensors coincides with the phase current flowing through that phase which was obtained from a current that was detected from two current sensors other than that phase.

5. An electric vehicle which is comprised of a battery for supplying electric power, a PWM inverter for converting DC current of that battery into AC power of variable voltage and variable frequency, a three phase AC motor, a speed sensor installed to accommodate the shaft of that three phase AC motor, a drive system comprised of several current sensors for detecting the current flowing through the winding of that three phase AC motor, a torque reference operation means that determines the torque reference of the three phase AC motor according to accelerator opening, an AC current reference operation means that determines the amplitude and phase of the AC current reference that flows through the winding of the three phase AC motor based on that torque reference and the rotating angular speed, a current control means that determines a three phase AC voltage reference in such a way that said three phase AC current will follow that AC current reference, and a PWM signal generation means that determines the gate signal which is applied to said PWM inverter based on that three phase AC voltage reference, wherein a fail-safe control method of this electric vehicle comprises the steps of switching said AC current reference operation means and the current control means to an AC voltage reference operation means when the failure of one of said current sensors is identified, said AC voltage reference operation means obtains said AC voltage reference utilizing the torque reference obtained from said torque reference operation means and the rotating angular speed of the three phase AC motor obtained from said speed sensor, thereby determining the gate signal which is applied to said PWM inverter based on an AC voltage reference which was obtained from said AC voltage reference operation means.

6. The fail-safe control method according to claim 5, further comprising the step of warning the driver about the failure of one of the current sensors when it is identified and at the same time uses in terms of said three phase AC current the current which is obtained by estimating the current flowing through that failing current sensor from the two remaining normal current sensors.

7. The fail-safe control method according to claim 5, further comprising the step of warning the driver about the failure of two or more current sensors when it is identified, at the same time, determining said AC voltage reference based on the slip angular frequency by estimating the torque which is generated at said three phase AC motor from the DC current which is input into said PWM inverter, and obtaining the slip angular frequency of the three phase AC motor by using that torque.

8. The fail-safe control method according to claim 5, further comprising the step of warning the driver about the failure of two or more current sensors when it is identified, at the same time, determining said AC voltage reference based on the slip angular frequency by setting up a predetermined rotating angular speed of said three phase AC motor, and obtaining the slip angular frequency of the three phase AC motor from the deviation between that set value of rotating angular speed and the actual rotating angular speed which is detected from the speed sensor.

9. The fail-safe control method according to claim 5, wherein the AC voltage reference operation means has a secondary flux reference operation means that determines the secondary flux reference based on said rotating angular speed to control a secondary flux generated in the secondary circuit of said AC motor, a slip angular frequency operation means that determines the slip angular frequency from the secondary flux reference obtained from that secondary flux reference operation means and the torque reference, a primary angular frequency operation means for determining the primary angular frequency reference of the PWM inverter from the slip angular frequency obtained from that slip angular frequency operation means and the rotating angular speed, a primary voltage operation means for determining the amplitude of an AC voltage reference from that primary angular frequency reference and said secondary flux reference, and a phase operation means for determining the phase of an AC voltage reference from the primary angular frequency reference to generate an AC voltage reference corresponding to said torque reference.

10. The fail-safe control method according to claim 5, wherein the AC voltage reference operation means is characterized by having a rotating angular speed operation means that manually determines said rotating angular speed, a secondary flux reference operation means that determines the secondary flux reference based on said rotating angular speed to control a secondary flux generated in the secondary circuit of said AC motor, a slip angular frequency operation means that determines the slip angular frequency from the secondary flux reference obtained from that secondary flux reference operation means and said torque reference, a primary angular frequency operation means for determining the primary angular frequency reference of the inverter from the slip angular frequency obtained from that slip angular frequency operation means and said rotating angular speed, a primary voltage operation means for determining the amplitude of an AC voltage reference from that primary angular frequency reference and said secondary flux reference, and a phase operation means for determining the phase of an AC voltage reference from said primary angular frequency reference to generate an AC voltage reference corresponding to said torque reference.

11. The fail-safe control method according to claim 5, further comprising the step of introducing the current that was estimated from the other two phase currents obtained from the two remaining normal current sensors to said current control means, and determining the gate signal which is applied to said PWM inverter in such a way that the AC current will follow said AC current reference when it is determined that a current sensor for detecting the phase current that flows through the winding of one phase is broken.

12. The fail-safe control method according to claim 5, further comprising the step of switching said AC current reference operation means to said AC voltage reference operation means, and determining the gate signal which is applied to said PWM inverter based on the AC voltage reference that was obtained from that AC voltage reference operation means when it is identified that two or more current sensors are broken.

13. The fail-safe control method according to claim 12, wherein the AC voltage reference operation means is characterized by having a secondary flux reference operation means that determines the secondary flux reference based on said rotating angular speed to control a secondary flux generated in the secondary circuit of said AC motor, a slip angular frequency operation means that determines the slip angular frequency from the secondary flux reference obtained from that secondary flux reference operation means and said torque reference, a primary angular frequency operation means for determining the primary angular frequency reference of the inverter from the slip angular frequency obtained from that slip angular frequency operation means and said rotating angular speed, a primary voltage operation means for determining the amplitude of said AC voltage reference from that primary angular frequency reference and said secondary flux reference, and a phase operation means for determining the phase of said AC voltage reference from said primary angular frequency reference to generate an AC voltage reference corresponding to said torque reference.

14. The fail-safe control method according to claim 5, further comprising the step of generating an AC voltage reference corresponding to said torque reference by having a rotating angular speed operation means that manually determines said rotating angular speed, a secondary flux reference operation means that determines the secondary flux reference based on said rotating angular speed to control a secondary flux generated in the secondary circuit of said AC motor, a slip angular frequency operation means that determines the slip angular frequency from the secondary flux reference obtained from that secondary flux reference operation means and said torque reference, a primary angular frequency operation means for determining the primary angular frequency reference of the inverter from the slip angular frequency obtained from that slip angular frequency operation means and said rotating angular speed, a primary voltage operation means for determining the amplitude of an AC voltage reference from that primary angular frequency reference and said secondary flux reference, and a phase operation means for determining the phase of an AC voltage reference from said primary angular frequency reference.

15. The fail-safe control method according to claim 5, further comprising the step of detecting a disorder wherein a speed sensor detects a disorder in the signal output from an encoder and estimates a rotating angular speed of that three phase AC motor from the value proportionate to torque reference of the said three phase AC motor and the value proportionate to torque of that three phase AC motor once a disorder is detected.

16. The fail-safe control method according to claim 15, further comprising the step of using torque current reference and torque current as the value proportionate to torque reference and the volume proportionate to torque, respectively.

17. The fail-safe control method according claim 15, further comprising the step of continuing the drive by determining the secondary flux reference of said three phase AC motor from that rotating angular speed, by determining the slip angular frequency from that secondary flux reference and said torque reference, and by determining the primary angular frequency of said PWM inverter from that slip angular frequency and said rotating angular speed, and once the encoder is found to be failing, and the rotating angular speed of said three phase AC motor is estimated.

18. An electric vehicle equipped with a battery for supplying electric power, a PWM inverter for converting DC current of that battery into AC power of variable voltage and variable frequency, a three phase AC motor for driving the vehicle, a speed sensor for generating several signals that have frequencies that are proportionate to the rotating angular speed of that three phase AC motor, current sensors for detecting the current flowing through that three phase AC motor, a three phase AC current reference generation means that generates a three phase AC current reference for controlling the phase current that flows through the winding of that three phase AC motor, and a signal generation means that generates signal which is applied to the gate of the PWM inverter based on the three phase AC current reference and the current of the three phase AC motor, wherein a failure detection method for the electric vehicle comprises the step of using at least two phase currents that are detected directly from said current sensors in determining disorder in said current sensors.

19. The failure detection method according to claim 18, further comprising the step of determining whether one of three current sensors is failing by mutually comparing the deviation of said three phase AC current reference from the three phase current which is detected from said current sensors when the requirement that the sum of respective phase currents detected directly shall be below predetermined value is not fulfilled.

20. The failure detection method according to claim 19, wherein the predetermined value is zero.

21. The failure detection method according to claim 18, further comprising the step of determining a current sensor failure by making the judgment of whether the phase current of each phase winding which is detected directly from one of said current sensors coincides with the phase current flowing through that phase which was obtained from a current that was detected from two current sensors other than that phase.

22. An electric vehicle which is comprised of a battery for supplying electric power, a PWM inverter for converting DC current of that battery into AC power of variable voltage and variable frequency, a three phase AC motor, a speed sensor installed to accommodate the shaft of that three phase AC motor, a drive system comprised of several current sensors equipped on the winding of that three phase AC motor, a torque reference operation means that determines the torque reference of the three phase AC motor according to accelerator opening, an AC current reference operation means that determines the amplitude and phase of the AC current reference that flows through the winding of said three phase AC motor based on that torque reference and the rotating angular speed, a current control means that determines a three phase AC voltage reference in such a way that the three phase AC current will follow that AC current reference, and a PWM signal generation means that determines the gate signal which is applied to said PWM inverter based on that three phase AC voltage reference, wherein the electric vehicle includes a fail-safe control means having a three phase AC voltage reference operation means, a switching means for switching said AC current reference operation means and the current control means to said AC voltage reference operation mean when the failure of one of said current sensors is identified, said AC voltage reference operation mean obtains said AC voltage reference utilizing the torque reference obtained from said torque reference operation means and the rotating angular speed of said three phase AC motor obtained from said speed sensor, thereby determining the gate signal which is applied to said PWM inverter based on an AC voltage reference which was obtained from said three phase AC voltage reference operation means.

23. An electric vehicle according to claim 22, wherein said AC voltage reference operation means is characterized by having a secondary flux reference operation means that determines the secondary flux reference based on said rotating angular speed to control a secondary flux generated in the secondary circuit of said AC motor, a slip angular frequency operation means that determines the slip angular frequency from the secondary flux reference obtained from that secondary flux reference operation means and said torque reference, a primary angular frequency operation means for determining the primary angular frequency reference of the inverter from the slip angular frequency obtained from that slip angular frequency operation means and said rotating angular speed, a primary voltage operation means for determining the amplitude of said AC voltage reference from that primary angular frequency reference and said secondary flux reference, and a phase operation means for determining the phase of said AC voltage reference from said primary angular frequency reference to generate an AC voltage reference corresponding to said torque reference.

24. An electric vehicle according to claim 22, wherein said AC voltage reference operation means is characterized by having a rotating angular speed operation means that manually determines said rotating angular speed, a secondary flux reference operation means that determines the secondary flux reference based on said rotating angular speed to control a secondary flux generated in the secondary circuit of said AC motor, a slip angular frequency operation means that determines the slip angular frequency from the secondary flux reference obtained from that secondary flux reference operation means and said torque reference, a primary angular frequency operation means for determining the primary angular frequency reference of the inverter from the slip angular frequency obtained from that slip angular frequency operation means and said rotating angular speed, a primary voltage operation means for determining the amplitude of an AC voltage reference from that primary angular frequency reference and said secondary flux reference, and a phase operation means for determining the phase of an AC voltage reference from the primary angular frequency reference to generate an AC voltage reference corresponding to said torque reference.

* * * * *